US008743913B2

(12) United States Patent
Aris et al.

(10) Patent No.: US 8,743,913 B2
(45) Date of Patent: Jun. 3, 2014

(54) DISTRIBUTED DIGITAL SUBSCRIBER LINE ACCESS MULTIPLEXER

(75) Inventors: Azrin Bin Aris, Serdang (MY); Siti Sawiah Binti Ramli, Serdang (MY); Muhammad Fahmy Bin Khyasudeen, Serdang (MY); Tet Hin Yeap, Ottawa (CA)

(73) Assignee: Telekom Malaysia Berhad, Kuala Lumpur (MY)

( * ) Notice: Subject to any disclaimer, the term of this patent is extended or adjusted under 35 U.S.C. 154(b) by 266 days.

(21) Appl. No.: 13/070,335

(22) Filed: Mar. 23, 2011

(65) Prior Publication Data

US 2011/0170581 A1 Jul. 14, 2011

Related U.S. Application Data

(62) Division of application No. 11/441,399, filed on May 26, 2006, now Pat. No. 7,936,674.

(30) Foreign Application Priority Data

Aug. 11, 2005 (MY) .................................. 20053740

(51) Int. Cl.
 *H04J 3/04* (2006.01)
(52) U.S. Cl.
 USPC ............................. 370/535; 370/352; 370/485
(58) Field of Classification Search
 USPC ......... 370/229, 230, 231, 235, 236, 351, 352, 370/389, 442, 464, 485, 486, 498, 535, 537, 370/542
 See application file for complete search history.

(56) References Cited

U.S. PATENT DOCUMENTS

| 7,088,678 | B1 | 8/2006 | Freed et al. |
| 2002/0101851 | A1* | 8/2002 | Blake et al. ................... 370/352 |
| 2002/0126685 | A1 | 9/2002 | Leatherbury et al. |
| 2003/0099239 | A1 | 5/2003 | Kim |
| 2004/0215807 | A1 | 10/2004 | Pinder et al. |
| 2005/0220180 | A1* | 10/2005 | Barlev et al. .................. 375/222 |
| 2007/0263651 | A1* | 11/2007 | Novotny et al. .............. 370/422 |

OTHER PUBLICATIONS

Notice of Allowance issued by the United States Patent and Trademark Office on Jan. 3, 2011 in connection with U.S. Appl. No. 11/441,399, 15 pages.

* cited by examiner

*Primary Examiner* — Michael Thier
*Assistant Examiner* — Feben M Haile

(57) ABSTRACT

A distributed DSLAM, which comprises a head end subsystem located within a switching facility and a remote subsystem located outside of the switching facility. The head end subsystem is operative for routing streams of data from a data network to the remote subsystem over a communication link, while the remote subsystem is operative for transmitting over a set of local loops analog signals comprising digitally modulated versions of the data. Separating the routing and modem functionality between inside and outside plant facilities reduces heat dissipation in the outside plant, leading to increased reliability. Flow control can be performed in the upstream and downstream directions by transmitting portions of individual packets and withholding other portions of individual packets. This is done instead of withholding the transmission of entire packets. As a result, the perceived impact on video quality, for example, is lessened.

18 Claims, 8 Drawing Sheets

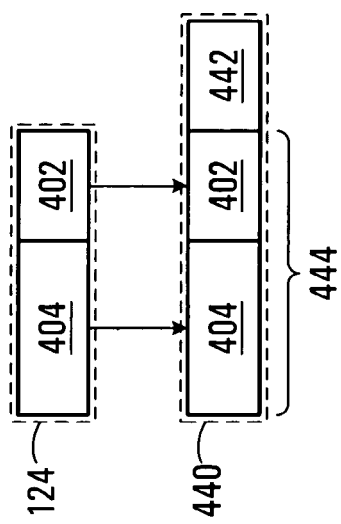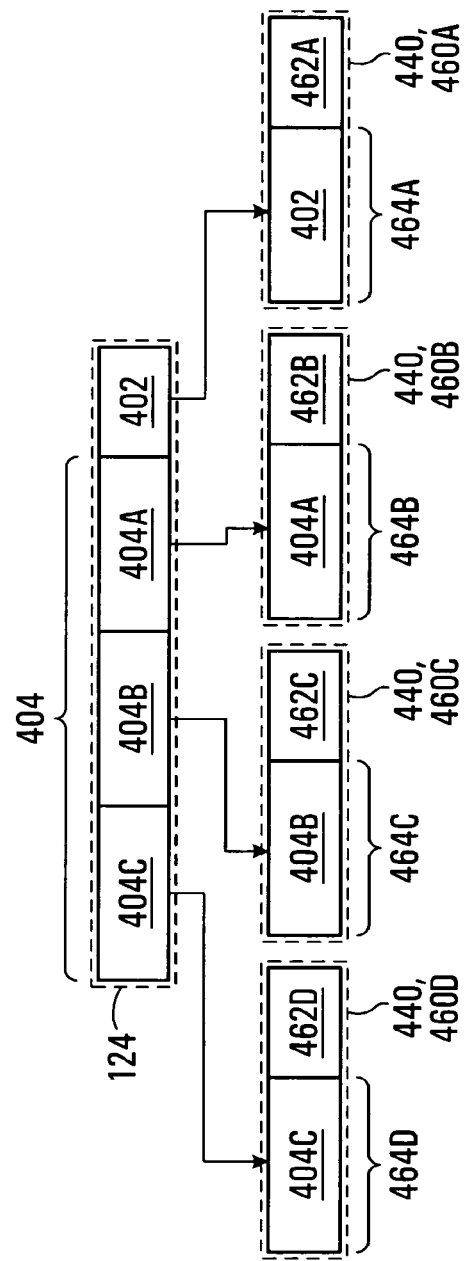

DISTRIBUTED DIGITAL SUBSCRIBER LINE ACCESS MULTIPLEXER

CROSS-REFERENCE TO RELATED APPLICATION

This application is a DIVISIONAL, and claims the benefit under 35 U.S.C. §120 and §121, of U.S. patent application Ser. No. 11/441,399 to Azrin Bin Aris et al., filed on May 26, 2006 now U.S. Pat. No. 7,936,674, hereby incorporated by reference herein.

FIELD OF THE INVENTION

The present invention relates generally to telecommunications and, more particularly, to an improved digital subscriber line access multiplexer (DSLAM).

BACKGROUND OF THE INVENTION

A digital subscriber line access multiplexer (DSLAM) is a device that allows a telecommunications company (telco) to deliver Internet access to its telephony subscribers. Typically, a DSLAM is located at the telco's central office (CO) and includes a modem subsystem that connects to a number of local loops forming part of the plain old telephony service (POTS) infrastructure leading to individual residential and business subscribers. The DSLAM also includes a routing subsystem connected to a data network (such as the Internet), thereby allowing the telco to act as an Internet Service Provider (ISP) for its telephony subscribers.

As high data rate Internet services such as video-on-demand become of increasing interest to subscribers, the issue of capacity arises. Specifically, as a consequence of requiring a much larger bandwidth than regular Internet browsing, the local loops between the DSLAM and the subscribers must be shortened. To this end, many telcos have resorted to placing their DSLAMs in an outside plant environment (i.e., outside the central office) and backhauling a high-speed communications link to the central office.

However, the placement of DSLAMs in the outside plant results in a large heat dissipation requirement brought on by the need to run both a modem subsystem and a routing subsystem in an environment where limited, if any, cooling facilities are available. This leads to an increased failure rate of outside plant equipment containing DSLAMs. It is therefore apparent that an improved DSLAM with lower outside plant heat dissipation would be a welcome improvement.

SUMMARY OF THE INVENTION

In accordance with a first broad aspect, the present invention may be summarized as a distributed DSLAM, comprising a head end subsystem located within a switching facility; a remote subsystem located outside of the switching facility; said head end subsystem being operative for routing streams of data from a data network to said remote subsystem over a communication link; said remote subsystem being operative for transmitting over a set of local loops analog signals comprising digitally modulated versions of the data.

In accordance with a second broad aspect, the present invention may be summarized as a method comprising routing data from a data network through a head end subsystem located within a switching facility to a remote subsystem located outside of the switching facility; and from the remote subsystem, transmitting over a set of local loops analog signals comprising digitally modulated versions of the data.

In accordance with a third broad aspect, the present invention may be summarized a method of controlling bandwidth utilization of a link between a head end subsystem and a remote subsystem, the remote subsystem being connectable to a plurality of local loops, the method comprising, at the head end subsystem: receiving from a data network a plurality of streams of packets, each said stream of packets being ultimately destined for a respective one of the local loops; determining a level of bandwidth throttling associated with at least one of said streams of packets; for a particular stream of packets associated with a non-zero level of bandwidth throttling, transmitting to the remote subsystem an incomplete version of certain ones of the packets in the particular stream of packets.

In accordance with a fourth broad aspect, the present invention may be summarized a distributed DSLAM, comprising a head end subsystem; and a remote subsystem for connection to the head end subsystem by a communication link, the remote subsystem being connectable to a plurality of local loops. The head end subsystem is operative for: receiving from a data network a plurality of streams of packets, each said stream of packets being ultimately destined for a respective one of the local loops; determining a level of bandwidth throttling associated with at least one of said streams of packets; for a particular stream of packets associated with a non-zero level of bandwidth throttling, transmitting to the remote subsystem an incomplete version of certain ones of the packets in the particular stream of packets. The remote subsystem is operative for receiving from the head end subsystem the particular stream of packets including the incomplete version of said certain ones of the packets in the particular stream of packets; reconstructing said certain ones of the packets in the particular stream of packets by completing with dummy data the incomplete version of said certain ones of the packets in the particular stream of packets; and transmitting the particular stream of packets including those reconstructed in the previous step over the local loop for which the particular stream of packets is destined.

In accordance with a fifth broad aspect, the present invention may be summarized a head end subsystem for providing DSL services over a plurality of local loops via a communications architecture that includes a remote subsystem connectable to the local loops and also connectable to the head end subsystem by a communications link, the head end subsystem comprising an input for receiving streams of packets, each stream of packets being destined for a respective one of the local loops; a control unit operative for determining a level of bandwidth throttling required for one or more of the local loops; a segmentation unit operative for breaking up packets in a particular stream of packets into corresponding sets of packet segments; a transmission unit operative for applying bandwidth throttling in the amount required for the individual local loops by releasing selected ones of the packet segments derived from broken up packets towards the local loop for which each respective broken up packet is destined.

In accordance with a sixth broad aspect, the present invention may be summarized a head end subsystem for providing DSL services over a plurality of local loops via a communications architecture that includes a remote subsystem connectable to the local loops and also connectable to the head end subsystem by a communications link, the head end subsystem comprising a routing unit for connection to a data network, said routing unit being operative for routing data received from the data network and destined for specific ones of the local loops to respective ones of its outputs; and a control unit operative for determining a level of bandwidth throttling required for one or more of the local loops; a segmentation unit having a plurality of inputs connected to the outputs of the routing unit and having a plurality of outputs, the segmentation unit being operative for breaking up packets received from the routing unit via a respective one of the inputs of the segmentation unit into respective sets of packet segments; a transmission unit operative for applying bandwidth throttling in the amount required for the individual local loops by releasing selected ones of the packet segments derived from broken up packets towards the local loop for which each respective broken up packet is destined; a multiplexer having a plurality of inputs and an output, each of said inputs being coupled to a respective one of said outputs of said transmission unit, said multiplexer being operative for multiplexing data arriving at its inputs into a signal released at its output onto the communication link.

In accordance with a seventh broad aspect, the present invention may be summarized a system for providing DSL, services to a plurality of subscribers via a communications architecture that includes a plurality of local loops respectively associated with the plurality of subscribers, the system comprising a head end subsystem; and a remote subsystem for connection to the local loops, the remote subsystem being connectable to the head end subsystem via a communication link. The head end subsystem comprises an input for receiving packets each destined for a respective one of the local loops; a control unit operative for determining a level of bandwidth throttling required for one or more of the local loops; a segmentation unit operative for breaking up packets having at least a certain size into corresponding sets of packet segments; a transmission unit operative for applying bandwidth throttling in the amount required for the individual local loops by releasing selected ones of the packet segments derived from broken up packets towards the local loop for which each respective broken up packet is destined.

In accordance with an eighth broad aspect, the present invention may be summarized as a remote subsystem for providing DSL services to subscribers over a plurality of local loops. The remote subsystem comprises a plurality of inputs for receiving packets originating from respective ones of the local loops; a segmentation unit operative for breaking up certain ones of the received packets into corresponding sets of packet segments; a transmission unit operative for applying bandwidth throttling by releasing selected ones of the packet segments in selected ones of the sets of packet segments towards a head end subsystem over a communication link.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIGS. 4A and 4B conceptually illustrate various ways of segmenting downstream packets, in accordance with embodiments of the present invention;

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

Figure 1A:
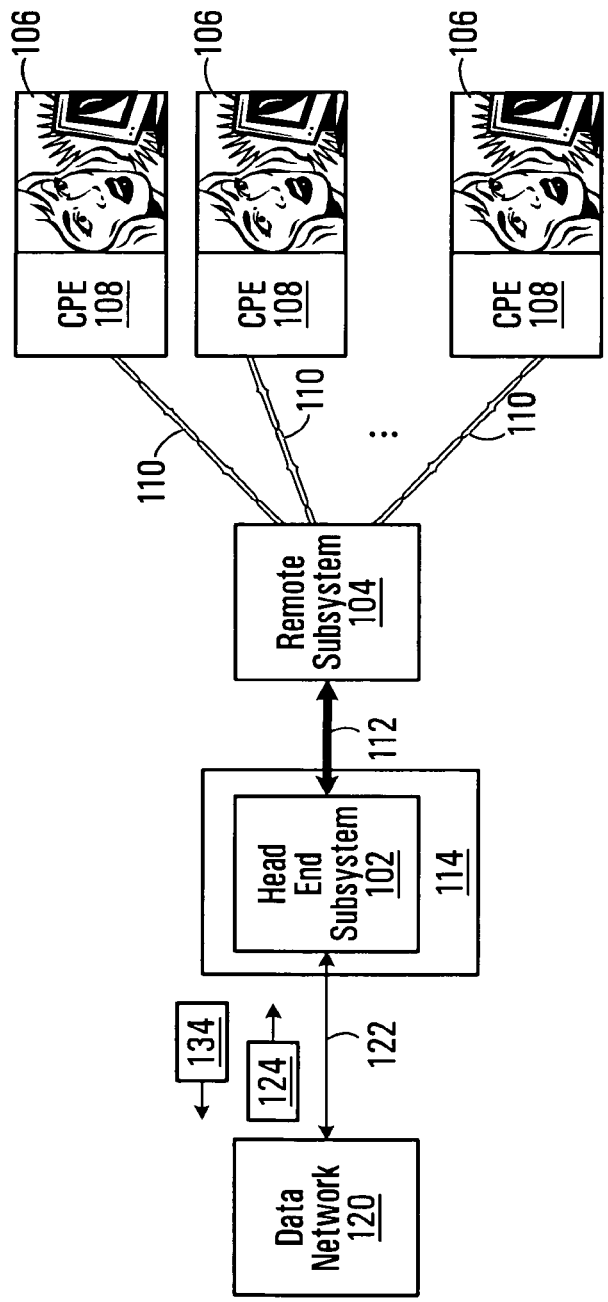
FIG. 1A shows in block diagram form a head end subsystem in communication with a remote subsystem, in accordance with an embodiment of the present invention.

With reference to FIG. 1A, a head end subsystem 102 communicates with a remote subsystem 104 to deliver digital subscriber line (DSL) services to a plurality of subscribers 106. The subscribers 106 are equipped with customer premises equipment (CPE) 108, which connect to the remote subsystem 104 via respective local loops 110, typically copper twisted pairs. A non-limiting example of a CPE 108 is a computer or set top box equipped with a modem for communicating across the respective local loop 110. The head end subsystem 102 is connected to the remote subsystem 104 via a high-capacity communication link 112 such as an optical fiber, coaxial cable, Gigabit Ethernet (GbE) cable or wireless link, to name a few non-limiting examples. Although in the illustrated embodiment only one remote subsystem 104 is shown, it should be understood that generally speaking, a plurality of remote subsystems may be connected to the head end subsystem 102 via, for example, a passive optical network.

The head end subsystem 102 is located inside a switching facility 114 of a telecommunications company (telco). In the example being described here, the switching facility 114 is a telco central office. For its part, the remote subsystem 104 is located outside of the switching facility 114. For instance, the remote subsystem 104 may be located at a distance of 1, 2, 3 or more kilometers (km) from the switching facility 114.

The head end subsystem 102 is connected to a data network 120 (such as the Internet) via a data link 122, which may include one or more physical connections. The head end subsystem 102 exchanges downstream packets 124 and upstream packets 134 with the data network 120 over the data link 122. The downstream packets 124 and the upstream packets 134 may include, without limitation, Internet Protocol (IP) packets. Details regarding the structure and operation of the head end subsystem 102 and the remote subsystem 104 will now be described.

Head End Subsystem 102

Figure 2A:
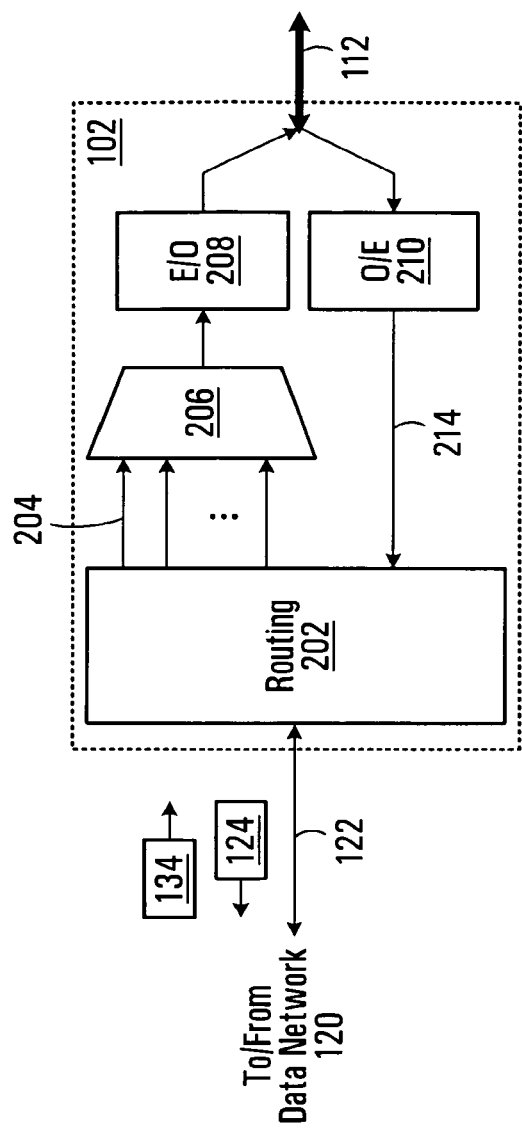
FIG. 2A shows in block diagram form details of the head end subsystem of FIGS. 1A and 1B, in accordance with an embodiment of the present invention.

Specifically, with reference to FIG. 2A, there is shown a head end subsystem 102 in accordance with a non-limiting embodiment of the present invention, in which the high-capacity communication link 112 is an optical fiber. The head end subsystem 102 comprises a routing unit 202, a multiplexer 206, an electro-optic conversion unit 208 and an opto-electronic conversion unit 210. The routing unit 202 is connected to the data network 120 by the data link 122. The routing unit 202 is also connected to the multiplexer 206 via a plurality of data links 204. The routing unit 302 is further connected to the opto-electronic conversion unit 210 by a data link 214. In an example embodiment, individual ones of the data links 204 are dedicated to respective ones of the local loops 110 subtending from the remote subsystem 104 (recall FIG. 1A). The routing unit 202 may be implemented in hardware, firmware, software or a combination thereof.

In downstream operation, the routing unit 202 receives downstream packets 124 from the data network 120. Each downstream packet 124 comprises a header and a body. The header comprises information (e.g., an identification of a local loop or CPE for which the packet is destined) which enables a routing unit such as the routing unit 202 to properly forward the downstream packet 124 towards its destination. Accordingly, the routing unit 202 reads each downstream packet 124 and sends it onto one of the data links 204 in accordance with information contained in the downstream packet 124. The multiplexer 206 thus receives streams of packets on the various data links 204 from the routing unit 202.

The multiplexer 206 combines the various streams of packets into a single high-speed signal. The multiplexing operation performed by the multiplexer 206 ensures that the per-local-loop components of the high-speed signal can be easily isolated by the remote subsystem 104, so as to avoid having to execute a complex routing function in the remote subsystem 104. In a non-limiting example, the multiplexer 206 is a time-division multiplexer, which allocates a recurring slice of time to each of the local loops 110. The high-speed signal is provided to the electro-optic conversion unit 208, which converts the received high-speed signal into optical form for downstream delivery over the optical fiber 112. Of course, it will be understood that if the high-capacity communication link 112 is not an optical fiber, then the appropriate transceiver interface would be used.

In the reverse (upstream) direction, the optical fiber 112 carries an upstream optical signal which is input to the opto-electronic conversion unit 210. The opto-electronic conversion unit 210 converts the received optical signal into a high-speed electrical signal containing upstream packets 134. The high-speed electronic signal is provided to the routing unit 202 along the data link 214. It is noted that demultiplexing is not required in the upstream direction, as the routing unit 202 will be able to distinguish the origin of the various upstream packets 134 in the high-speed electrical signal from the contents of their respective headers.

Remote Subsystem 104

Figure 2B:
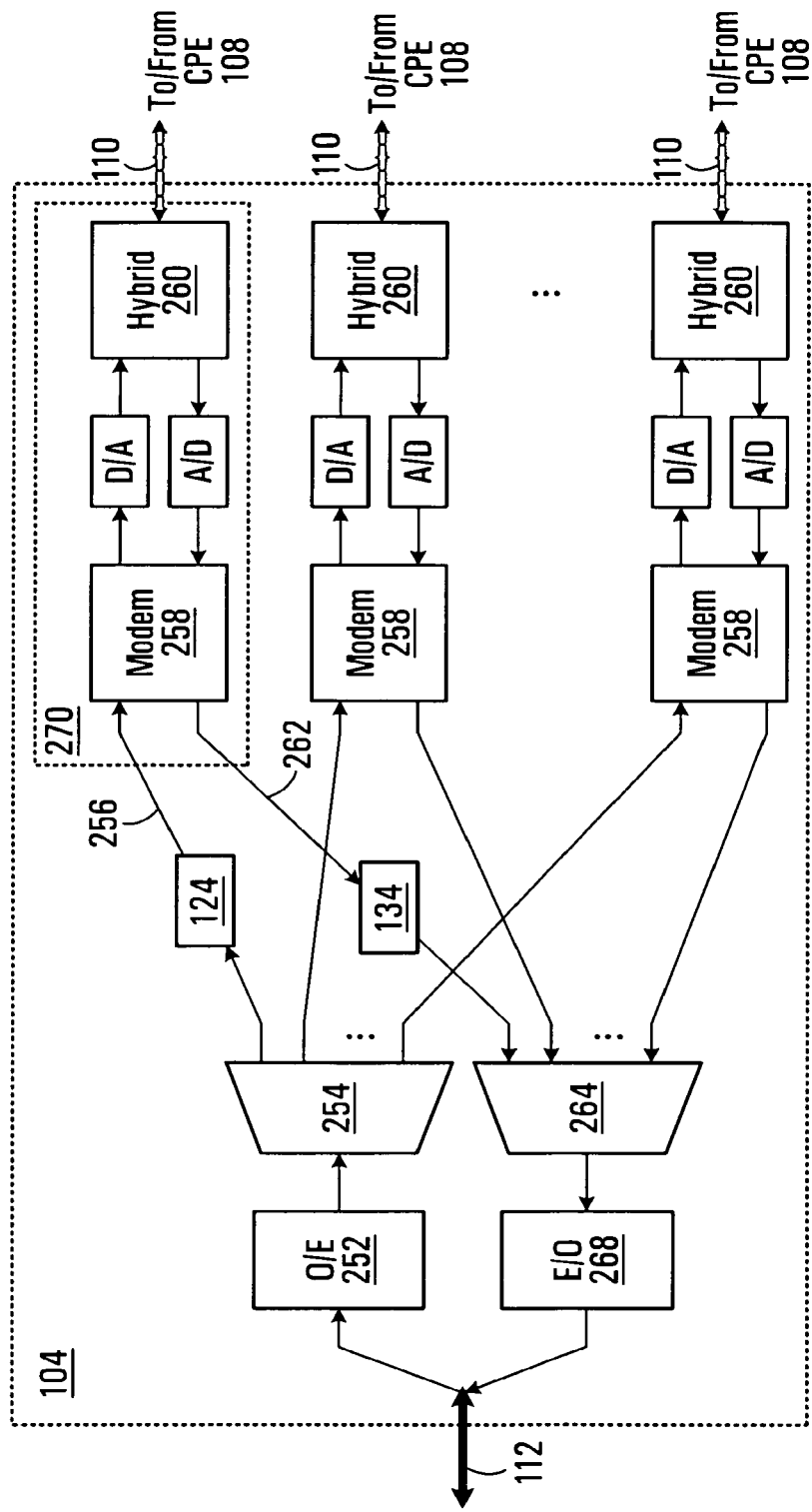
FIG. 2B shows in block diagram form details of the remote subsystem of FIGS. 1A and 1B, in accordance with an embodiment of the present invention.

With reference now to FIG. 2B, there is shown a remote subsystem 104 in accordance with an embodiment of the present invention in which the high-capacity communication link 112 is again an optical fiber. The remote subsystem 104 comprises an opto-electronic conversion unit 252 which is connected to a demultiplexer 254. The demultiplexer 254 has a plurality of outputs which respectively lead to a plurality of loop processing units 270 (only one of which is shown in dashed outline). Each loop processing unit 270 comprises a modem 258, a digital-to-analog (D/A) converter, an analog-to-digital (A/D) converter and a hybrid 260. Also connected to the modem 258 of the various loop processing units 270 is a multiplexer 264, whose output is connected to the optical fiber 112 via an electro-optic conversion unit 268.

In operation, the optical fiber 112 carries an optical signal that contains downstream packets 124 destined for the various CPEs 108/local loops 110. The opto-electronic conversion unit 252 converts the optical signal into a high-speed electrical signal, which is fed to the demultiplexer 254. The demultiplexer 254 reverses the effect of the multiplexer 206 in the head end subsystem 102 by separating the packet streams in the high-speed electrical signal received from the opto-electronic conversion unit 252 on a per-local-loop basis. If the multiplexer 206 was a time-division multiplexer, then the demultiplexer 254 will similarly be a time-division demultiplexer which allocates a given packet to a given local loop on the basis of the time slice occupied by the given packet.

Thus, the downstream packets 124 destined for a particular one of the CPEs 108/local loops 110 are sent to the modem 258 in the respective loop processing unit 270. Similarly, in the reverse direction, the modems 258 in the various loop processing units 270 will provide respective streams of upstream packets 134 to respective inputs of the multiplexer 264. The multiplexer 264 combines the various streams of upstream packets 134 together into a high-speed signal which is provided to the electro-optic conversion unit 268. In a non-limiting example embodiment, the multiplexer 264 is a time-division multiplexer. The electro-optic conversion unit 268 performs conversion of the high-speed signal received from the multiplexer 264 into optical form, and the resulting optical signal is released onto the optical fiber 112 for upstream transmission to the head end subsystem 102.

Turning now to operation of a given one of the loop processing units 270, the modem 258 modulates the downstream packets 124 received from the demultiplexer 254 into a form suitable for transmission onto the respective local loop 110. This may involve modulation using a format such as DMT, CAP, QAM, QPSK, etc. but of course other formats may be used without departing from the spirit of the invention. The modem 258 outputs a modulated signal to the digital-to-analog converter, which outputs an analog signal to the hybrid 260. The hybrid 260, which is connected to the local loop 110, is a standard component in the industry, allowing a signal to be added in one direction of travel along a wire while extracting a signal from the other direction of travel along the same wire. As a result of the functionality of the hybrid 260, a downstream analog signal is sent to the CPE 108 over the local loop 110, while at the same time the hybrid 260 receives an upstream analog signal from the local loop 110. This upstream analog signal is fed to the analog-to-digital converter, which outputs a digital signal for demodulation by the modem 258 into upstream packets 134. The upstream packets 134 are then transmitted to the multiplexer 264 as already described above.

Thus, it will be appreciated from the above that the head end subsystem 102 and the remote subsystem 104 cooperate with one another to deliver DSL access over the plurality of local loops 110. In other words, one can view the head end subsystem 102 and the remote subsystem 104 as implementing a "distributed" DSLAM. Those skilled in the art will also appreciate that because routing functionality is the responsibility of the head end subsystem 102, the remote subsystem 104 of the present invention has a lower processing requirement than a conventional DSLAM implemented entirely in the outside plant. This lower processing requirement advantageously results in less heat dissipation, which means that the remote subsystem 104 is less likely to require servicing.

Implementation in Conjunction with Digital Loop Carrier

Figure 1B:
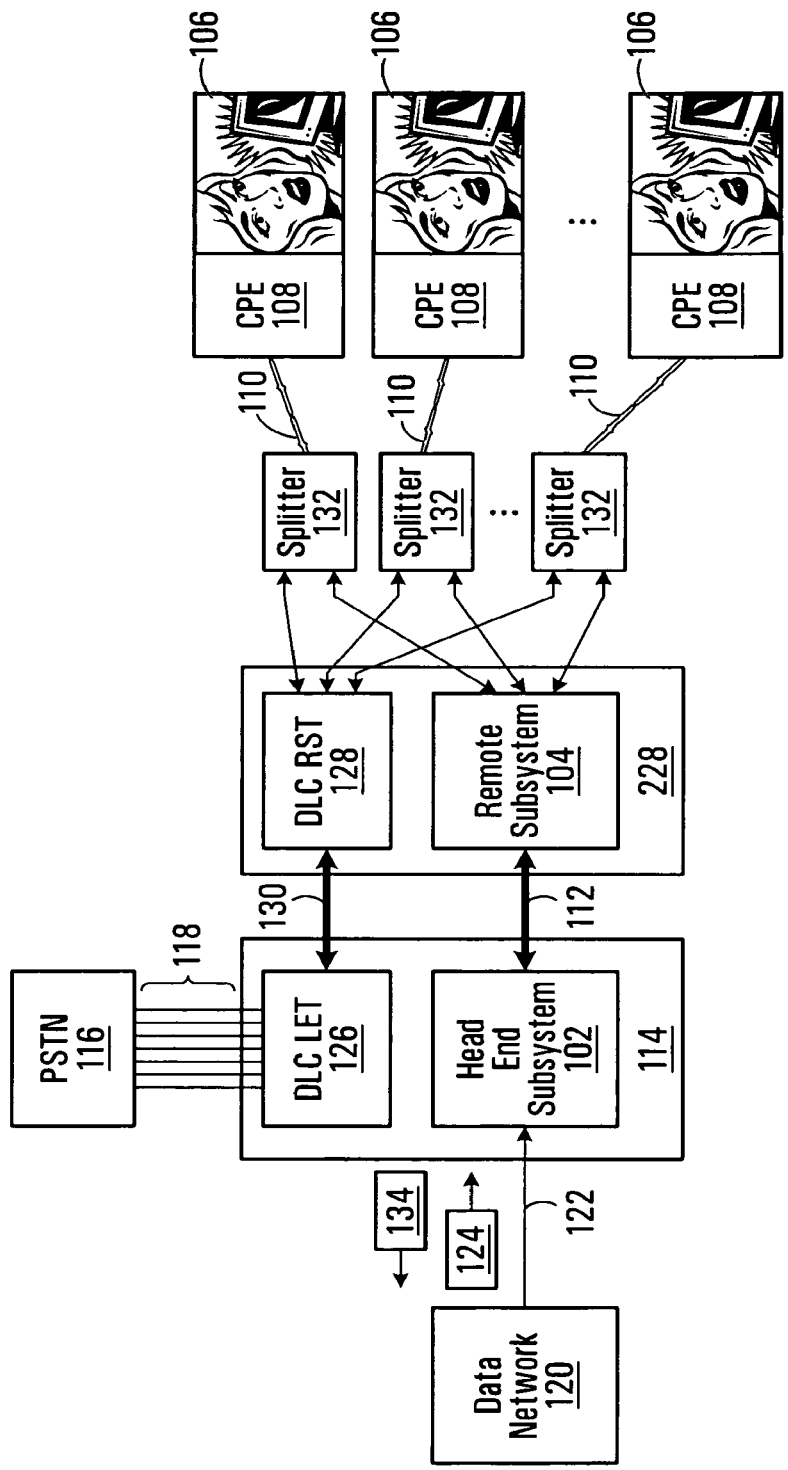
FIG. 1B shows the elements of FIG. 1A in combination with the components of a digital loop carrier.

Another advantage of the present invention is that it can be implemented in harmony with current digital loop carrier (DLC) initiatives. Specifically, when a service area is too far to be served by a telco's central office, a DLC can be used. With reference now to FIG. 1B, a DLC consists of a local exchange terminal (LET) 126 and a remote subscriber terminal (RST) 128. The LET 126, which is housed in the switching facility 102, interfaces with the public switched telephone network (PSTN) 116 via a set of analog telephone lines 118. Both the LET 126 and the RST 128 bundle a number of individual analog phone line signals into a single multiplexed digital signal for local traffic between the LET 126 and the RST 128 over a communication link 130, such as a carrier line (e.g., T1/E1) or optical fiber cable.

In accordance with an embodiment of the present invention, a remote site 228 which has been deployed in the field for the purposes of delivering telephony services using the aforementioned RST 128 is expanded to include the aforementioned remote subsystem 104. This can alternatively but equivalently be interpreted as expanding the remote subsystem 104 to include the RST 128.

Now, in order to allow both baseband telephony signals and DSL signals to coexist over the same local loop 110, a POTS splitter 132 is introduced in the local loop 110. Incidentally, it is envisaged that the CPE 108 will include not only a computer or similar for DSL services, but also a telephone for baseband telephony services.

Moreover, it is envisaged that introducing a further layer of multiplexing to combine the baseband telephony signals and the DSL signals may be advantageous as it would allow both the DLC equipment (126, 128) and the distributed DSLAM (102, 104) to communicate over the same physical communication link, such as a single fiber optic cable, thereby allowing the communication links 112, 130 to be merged into a single communication link.

While the capacity of the high-capacity communication link 112 is high as its name suggests, it is not infinite. Thus, it is possible that the demand across all local loops 110 exceeds the supply (which can be defined as the capacity of the high-capacity communication link 112). This may especially arise in the context of delivering video over DSL. Consequently, in the downstream direction, there becomes a need to control bandwidth usage on the high-capacity communication link 112 between the head end subsystem 102 and the remote subsystem 104. This also applies to the upstream direction, although to a lesser extent.

One simple approach to bandwidth usage control is to drop selected downstream packets at the head end subsystem 102 (and similarly, in the upstream direction, to drop selected upstream packets at the remote subsystem 104). However, as packets carrying IP video tend to be rather large in size, the loss of an entire packet may have a non-negligible negative impact on the image quality. Thus, it may be desirable to control bandwidth usage without having to drop entire packets.

Accordingly, an embodiment of the present invention provides that packets are segmented and, for the purposes of the high-speed communication link 112, certain portions of certain packets are withheld from transmission on the high-speed communication link 112. Then, the packet is reconstructed by inserting dummy data to replace those portions that were withheld. A more detailed description of such an embodiment is now provided.

Variant Using Flow Control

Figure 3:
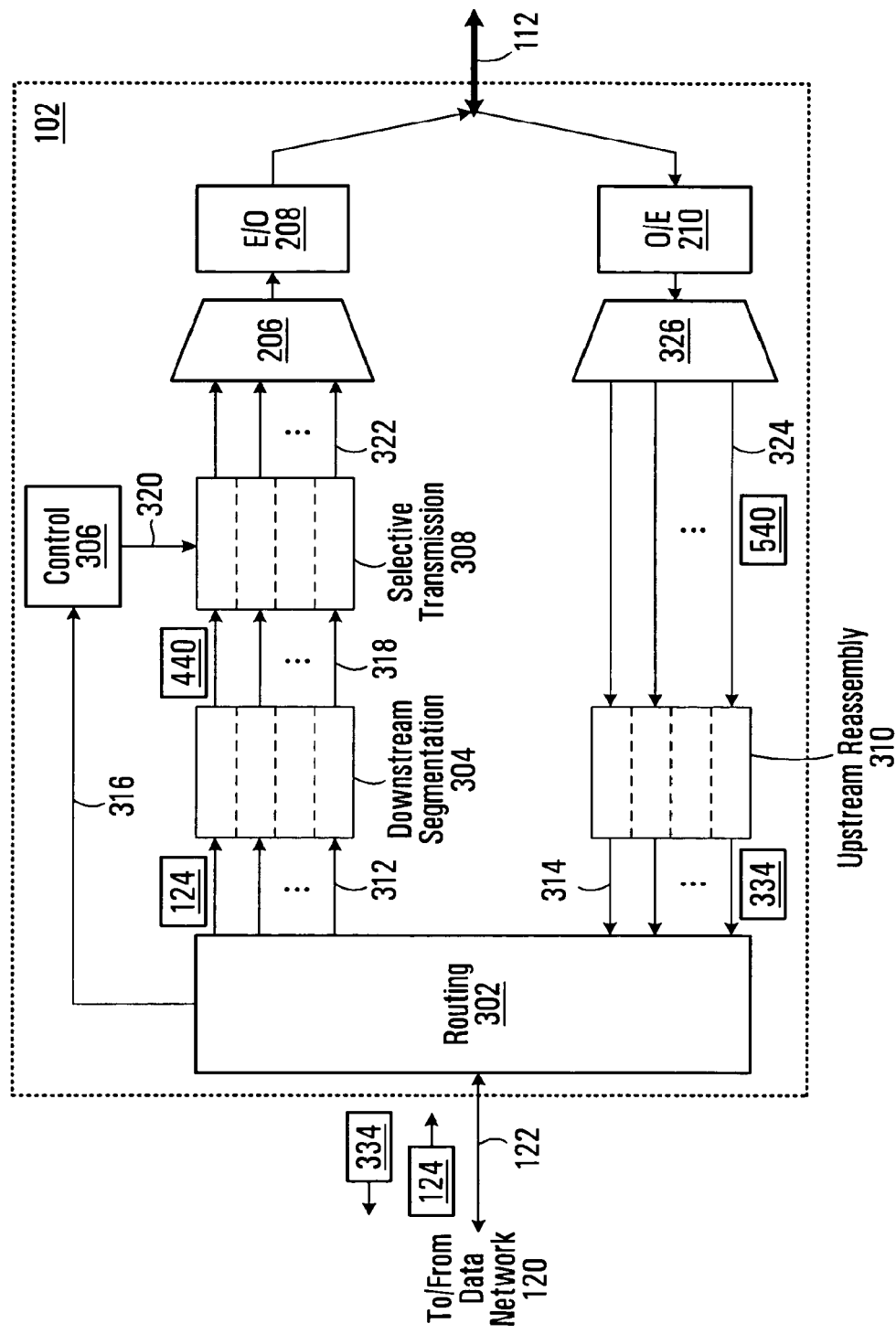
FIG. 3 shows in block diagram form details of the head end subsystem of FIGS. 1A and 1B, in accordance with another embodiment of the present invention.

With reference to FIG. 3, there is shown a head end subsystem 102* in some detail, in accordance with another embodiment of the present invention. Again, the high-capacity communication link 112 is taken to be an optical fiber by way of non-limiting example. Specifically, the head end subsystem 102* (which is a modified version of the previously described head end subsystem 102) comprises a routing unit 302 (which is a modified version of the previously described routing unit 202), the previously described multiplexer 206, the previously described electro-optic conversion unit 208 and the previously described opto-electronic conversion unit 210. In addition, there is provided a downstream segmentation unit 304, a control unit 306, a selective transmission unit 308 and an upstream reassembly unit 310, which will now be described.

The routing unit 302 is connected to the data network 120 by the data link 122. The routing unit 302 is also connected to the downstream segmentation unit 304 via a plurality of data links 312 and to the upstream reassembly unit 310 via a plurality of data links 314. In an example embodiment, a respective one of the data links 312 and a respective one of the data links 314 is dedicated to each of the local loops 110 subtending from the remote subsystem (to be described later on in greater detail). In addition, the routing unit 302 is connected to the control unit 306 via a control link 316. The routing unit 302 may be implemented in hardware, firmware, software or a combination thereof.

In downstream operation, the routing unit 302 receives downstream packets 124 from the data network 120. As previously mentioned, each downstream packet 124 comprises a header and a body. The header comprises information which enables a routing unit such as the routing unit 302 to properly forward the downstream packet 124 towards its destination. In some cases, the header of the downstream packet 124 will identify a local loop 110 or CPE 108 as the destination. In other cases, the downstream packet 124 may be a control packet that is destined for the control unit 306. The routing unit 302 reads each downstream packet 124 and sends it either to the control unit 306 via the control link 316 or onto one of the data links 312, depending on the information contained in the header of the downstream packet 124.

The downstream segmentation unit 304 receives downstream packets 124 from the routing unit 302 over the plurality of links 312, each of the links 312 being associated to a respective one of the local loops 110. Specifically, each of the data links 312 carries downstream packets destined for a corresponding one of the CPEs 108 to be delivered via the respective local loop 110. The downstream segmentation unit 304 is connected to the selective transmission unit 308 via a plurality of data links 318. In an example embodiment, the downstream segmentation unit 304 is made up of a bank of individual segmentation units, each associated with a respective one of the local loops 110. The downstream segmentation unit 304 may be implemented in hardware, firmware, software or a combination thereof.

The downstream segmentation unit 304 segments each of the downstream packets 124 received along the various data links 312 into one or more corresponding encapsulated packets 440. The output of the downstream segmentation unit 304 is thus a plurality of streams of encapsulated packets 440, provided to the selective transmission unit 308, each such stream being provided over a respective one of the data links 318.

Various example ways in which the downstream segmentation unit 304 segments a downstream packet 124 into one or more encapsulated packets 440 are now described with continued reference to FIG. 3 and with additional reference to FIGS. 4A and 4B. The downstream packet 124 has a header 402 and a body 404. Typically, the body 404 is longer, in fact usually many times longer, than the header 402. The header 402 may include information regarding the overall length of the downstream packet 124 and thus the downstream segmentation 304 unit first reads the header 402 of the downstream packet 124 to determine the length of the downstream packet 124.

In a specific non-limiting embodiment, if the length of the downstream packet 124 exceeds a certain predetermined threshold size, then the downstream packet 124 is deemed to require segmentation, otherwise the downstream packet 124 is deemed not to require segmentation. The predetermined threshold size may be fixed or provided to the downstream segmentation unit 304 in a dynamic fashion. Of course, other ways of determining whether the downstream packet 124 requires segmentation can be used.

If the downstream packet 124 is deemed not to require segmentation (FIG. 4A), then the entire downstream packet 124 (including its header 402 and its body 404) becomes the body 444 of an encapsulated packet 440 that has its own header 442. The header 442 of the encapsulated packet 440 indicates that the body 444 of the encapsulated packet 440 comprises an integral (i.e., non-segmented) packet, in this case downstream packet 124. On the other hand, if the downstream packet 124 is deemed to require segmentation, e.g., due to exceeding a certain length (FIG. 4B), then multiple encapsulated packets 440 are formed from the header 402 and the body 404 of the downstream packet 124.

In the specific embodiment shown in FIG. 4B, the header 402 of the downstream packet 124 is placed into the body 464A of a first encapsulated packet 460A, while and the body 404 of the downstream packet 124 is split up into a plurality of (in this case three) segments 404A, 404B, 404C that are placed into the bodies 464B, 464C, 464D of corresponding encapsulated packets 460B, 460C, 460D other than the first encapsulated packet 460. The size of the first encapsulated packet 460A will typically be different from the size of the other encapsulated packets 460B, 460C, 460D. Furthermore, the downstream segmentation unit 304 creates a header 462A, 462B, 462C, 462D for each of the encapsulated packets 460A, 460B, 460C, 460D, which contains an indication of whether it is the header 402 or a particular segment of the body 404 of the corresponding downstream packet 124 that is carried in the body of the respective encapsulated packet. For example, the headers 462A, 462B, 462C and 462D may contain sequence information that can be interpreted as "header for packet X", "segment 1 of 3 of body of packet X", "segment 2 of 3 of body of packet X" and "segment 3 of 3 of body of packet X", respectively.

In a variant of the embodiment of FIG. 4B, it may be considered advantageous to have a consistent size of the encapsulated packets 440. To this end, the usually shorter header 402 of the downstream packet 124 is placed into the body of one encapsulated packet along with a first segment of the body 404 of the downstream packet 124. The remainder of the body 404 of the downstream packet 124 is split up into two or more second segments that are placed into the bodies of corresponding encapsulated packets other than the first encapsulated packet. The size of the first segment of the body 404 of the downstream packet 124 will be less than the size of each second segment of the body 404 of the downstream packet 124, so as to render each of the encapsulated packets (including the one containing the header 402 of the downstream packet 124) of approximately the same size.

Returning to FIG. 3, the control unit 306 is now described. The control unit 306 provides control of the selective transmission unit 308 by supplying a bandwidth control signal via a control link 320.

In a non-limiting example embodiment, the bandwidth control signal is generated on the basis of a flow control algorithm executed by the control unit 306 using hardware, firmware, software or a combination thereof. In another non-limiting example embodiment, the routing unit 302 estimates the status of the downstream and upstream traffic and provides control information to the control unit 306 so that localized network traffic optimization can be performed for the head end subsystem 102 serving customers in a certain geographical region.

It should be understood that there is no particular limitation on the flow control algorithm that may be executed by the routing unit 302 or the control unit 306, and that any existing or newly developed flow control algorithms can be used.

In either case, the bandwidth control signal that results from execution of the flow control algorithm and which is output on the control link 320 is an indication of how much bandwidth throttling is required for each of the local loops 110, namely how much of the data originally destined for each of the local loops 110 should be withheld (i.e., not transmitted along the high-capacity communication link 112). This information, which represents a data rate reduction on a per-local-loop basis, may be communicated to the selective transmission unit 308 in the form of an absolute (e.g., Mbps) or relative (e.g., percentage) amount.

In a very simple example not to be considered limiting, consider the case where the capacity of the high-capacity communication link 112 is 80 Mbps, and the aggregate data rate that is demanded by the individual CPEs 108 amounts to 100 Mpbs. The aggregate data rate that is demanded by the CPEs 108 may be determined in a variety of ways, such as from a statistical observation of the size of the various individual downstream packets 124 received from the data network 120, a measurement of buffer occupancy in the downstream segmentation unit 304, a value computed by a higher-level application in the switching facility 114 (or elsewhere) and provided via a control packet, etc.

In order to reduce the data rate over the high-capacity communication link 112 to 80 Mbps, a data rate reduction of 20 Mpbs (or, equivalently, 20%) needs to be applied. Accordingly, in a non-limiting example embodiment of the present invention, the bandwidth control signal provided by the control unit 306 via the control link 320 informs the selective transmission unit 308 of the required level of bandwidth throttling (either 20 Mbps or 20%). In the example being described, the required level of bandwidth throttling is applicable to all local loops 110. However, depending on the sophistication of the flow control algorithm being executed by the control unit 306, individualized bandwidth control may be applied to each of the local loops 110.

In the context of algorithm sophistication, consider, for example, the scenario where the control unit 306 receives certain ones of the downstream packets 124 referred to as control packets from the routing unit 302 via the aforementioned control link 316. Examples of information that may be conveyed by a control packet include, without limitation, the relative priority of specific services (e.g., video versus data, or among different video streams) delivered to specific subscribers, or the relative priority of the various subscribers (e.g., gold, silver, bronze). This information may be provided as inputs to the flow control algorithm if such is executed by the control unit 306. It should be understood that there is no particular limitation on the flow control algorithm that may be executed by the control unit 306 or the routing unit 302, and that any existing or newly developed flow control algorithms can be used.

The selective transmission unit 308 receives encapsulated packets 440 from the downstream segmentation unit 304 over the plurality of links 318. In addition, the selective transmission unit 308 receives a bandwidth control signal from the control unit 306 via the control link 320. The selective transmission unit 308 is further connected to a set of input ports of the multiplexer 206 via a plurality of links 322 over which selected ones of the encapsulated packets 440 received from the downstream segmentation unit 304 are transmitted. In an example embodiment, the selective transmission unit 308 is made up of a bank of individual transmission units, one for each of the local loops subtending from the remote subsystem (to be described later on in greater detail). In this case, each individual transmission unit receives a stream of encapsulated packets 440 from the downstream segmentation unit 304 and outputs a stream of encapsulated packets 440 to a respective input port of the multiplexer 206. The selective transmission unit 308 may be implemented in hardware, firmware, software or a combination thereof.

The purpose of the selective transmission unit 308 is to reduce bandwidth over the high-capacity communication link 112 on the basis of the bandwidth control signal provided by the control unit 306. Thus, for example, where the bandwidth control signal specifies that a certain local loop 110 (or, for that matter, each local loop 110) requires its data rate to be reduced by a certain non-zero amount, this causes the selective transmission unit 308 to withhold selected ones of the encapsulated packets 440 so as to result in the desired data rate reduction.

In order to allow the remote subsystem to perform a reconstruction operation on the downstream packets 124, it would be advantageous to refrain from withholding encapsulated packets 440 that contain the headers 402 of the downstream packets 124. In other words, in the example of FIG. 4B, encapsulated packets 460B, 460C and 460D are potential candidates for being withheld, while encapsulated packet 460A, which contains the header 402 of the downstream packet 124, would preferably be transmitted towards the respective local loop 110. The withheld encapsulated packets can be discarded, deleted, archived, etc. Of course, it is within the scope of the present invention to use other methods of selecting which encapsulated packets to transmit and which to withhold, in order to achieve a specific data rate reduction target.

It should be appreciated that the required data rate reduction target can be achieved by considering multiple encapsulated packets 440 that are derived from more than a single downstream packet 124. For example, if a data rate of 20% needs to be applied, then it is within the scope of the present invention to withhold every fifth encapsulated packet 440 not containing the header of a corresponding downstream packet 124. As a result of this technique, and depending on the size of each individual downstream packet 124, this could result in some downstream packets 124 having one of their encapsulated packets 440 withheld, other downstream packets 124 having multiple ones of their encapsulated packets 440 affected and still other downstream packets 124 passing through the selective transmission unit 308 unscathed.

The selective transmission unit 308 sends the "selected" encapsulated packets 440 (i.e., those that remain after data rate reduction has been performed by the selective transmission unit 308) destined for a particular local loop 110 to the multiplexer 206 over a respective one of the plurality of data links 322. The composition of the selected encapsulated packets 440 therefore includes at least one encapsulated packet 440 derived from each downstream packet 124 received from the data network 120. At least one of these will include the header 402 of the corresponding downstream packet 124.

It is recalled that the encapsulated packets 440 include their own headers (e.g., 462A, 462B, 462C, 462D), and thus where a particular encapsulated packet (say, 460C in FIG. 4B) has been selectively withheld from transmission by the selective transmission unit 308, there will be a gap in the sequence count of the remaining encapsulated packets (460A, 460B, 460D).

The multiplexer 206 thus receives streams of encapsulated packets 440 via the various data links 322 from the selective transmission unit 308. The multiplexer 206 combines the various streams of encapsulated packets 440 into a single high-speed signal. The multiplexing operation performed by the multiplexer 206 ensures that the per-local-loop components of the high-speed signal can be easily isolated by the remote subsystem, so as to avoid having to execute a complex routing function therein. In a non-limiting example, time division multiplexing (TDM) may be used to multiplex the streams of encapsulated packets 440 destined for different local loops 110. The high-speed signal is provided to the electro-optic conversion unit 208, which converts the received high-speed signal into optical form for downstream delivery over the optical fiber 112.

Figure 5:
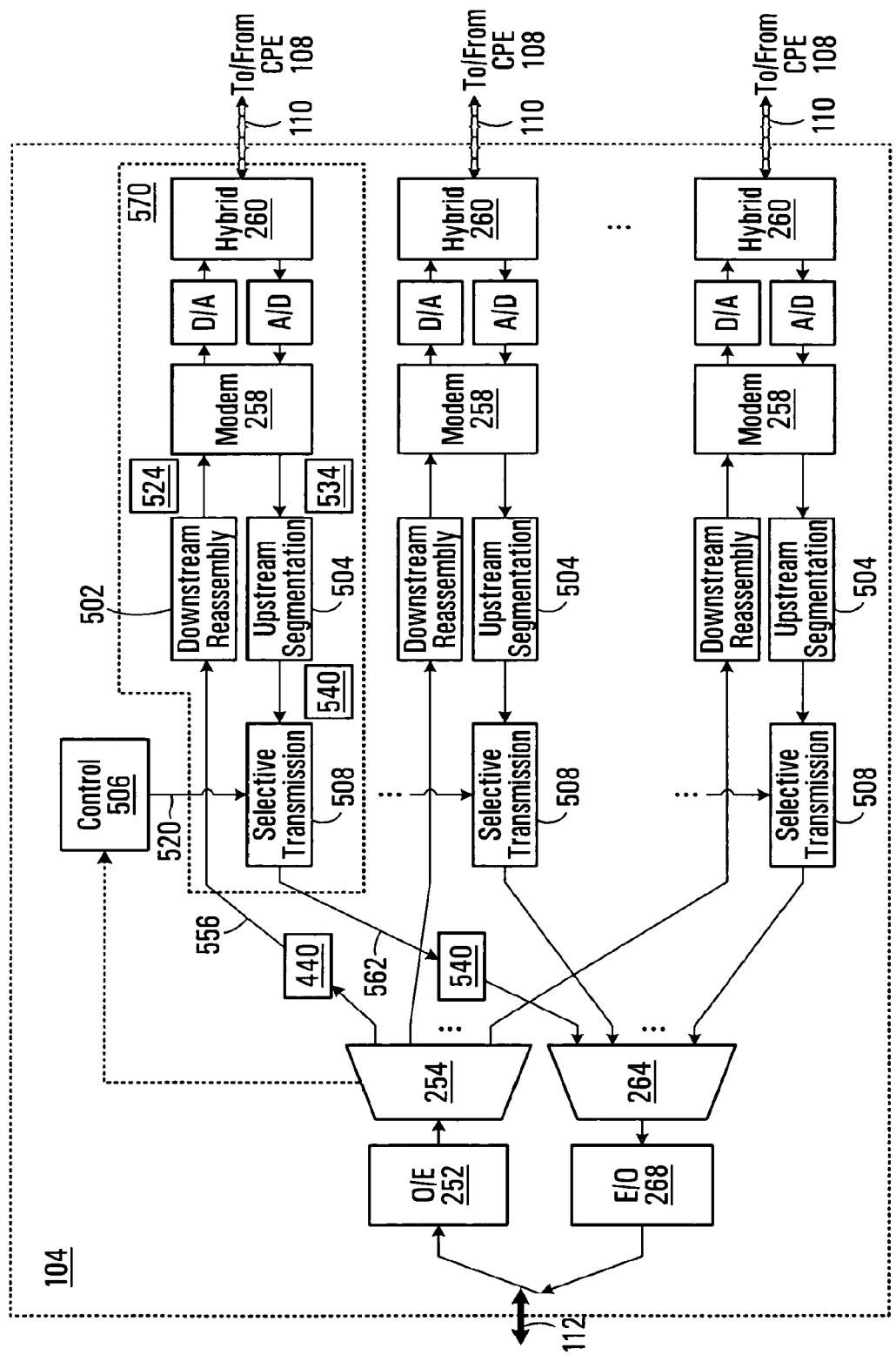
FIG. 5 shows in block diagram form details of the remote subsystem of FIGS. 1A and 1B, in accordance with yet another embodiment of the present invention.

With reference now to FIG. 5, the above-referenced remote subsystem 104* (which is a modified version of the remote subsystem 104 previously described with reference to FIG. 2B) is now described. The remote subsystem 104* comprises the previously described opto-electronic conversion unit 252 connected to the previously described demultiplexer 254. The remote subsystem 104* also comprises the previously described multiplexer 264 connected to the previously described electro-optical conversion unit 268. The demultiplexer 254 and the multiplexer 264 are connected to a respective one of a plurality of loop processing units 570 (only one of which is shown in dashed outline). In addition, the remote subsystem 104* comprises a control unit 506. Each of the loop processing units 570 comprises the previously described modem 258, digital-to-analog converter, analog-to-digital converter and hybrid 260, in addition to a downstream reassembly unit 502, an upstream segmentation unit 504 and a selective transmission unit 508.

In downstream operation, the optical fiber 112 carries an optical signal that contains encapsulated packets 440 destined for the various local loops 110/CPEs 108. The opto-electronic conversion unit 252 converts the optical signal into a high-speed electrical signal, which is fed to the demultiplexer 254. The demultiplexer 254 reverses the effect of the multiplexer 206 in the head end subsystem 102* by extracting from the high-speed electrical signal received from the opto-electronic conversion unit 252 a plurality of packet streams on a per-local-loop basis. If the multiplexer 206 was a TDM multiplexer, then the demultiplexer 254 can appropriately also be a TDM demultiplexer. As a result of the demultiplexing operation performed by the demultiplexer 254, a stream of packets containing the encapsulated packets 440 destined for a particular one of the local loops 110/CPEs 108 is sent to the respective loop processing unit 570 via a data link 556.

At the loop processing unit 570, the stream of packets of packets containing the encapsulated packets 440 destined for a particular one of the local loops 110/CPEs 108 is received by the downstream reassembly unit 502. The downstream reassembly unit 502 creates a stream of reconstructed downstream packets 524 on the basis of the received encapsulated packets 440. The downstream reassembly unit 502 may be implemented in hardware, firmware, software or a combination thereof.

Specifically, it is recalled that the encapsulated packets 440 were created by the downstream segmentation unit 304 (in the head end subsystem 102*) and were selected by the selective transmission unit 308 (also in the head end subsystem 102*) from a possibly larger original set of encapsulated packets 440 in order to achieve data rate reduction targets for the high-capacity communication link 112. Stated differently, the set of encapsulated packets 440 which happen to be associated with a common original downstream packet 124, and which are received at the remote subsystem 104*, may include fewer than all the encapsulated packets 440 derived from that original downstream packet 124 through action of the downstream segmentation unit 304 in the head end subsystem 102* .

Thus, it becomes impossible for the downstream reassembly unit 502 to reconstruct with 100% correctness certain ones of the original downstream packets 124. This is contrasted with the desire to retain the semblance of complete packets when delivering content to the subscriber 106. Accordingly, the downstream reassembly unit 502 functions to identify gaps in the received encapsulated packets 440 and to compensate for those gaps by inserting dummy information at specific locations of certain reconstructed downstream packets 524. Identification of the gaps can be facilitated if a sequence counter or other mechanism was used in the head end subsystem 102* to identify sequence information for each encapsulated packet 440 derived from a common downstream packet 124.

Figure 6:
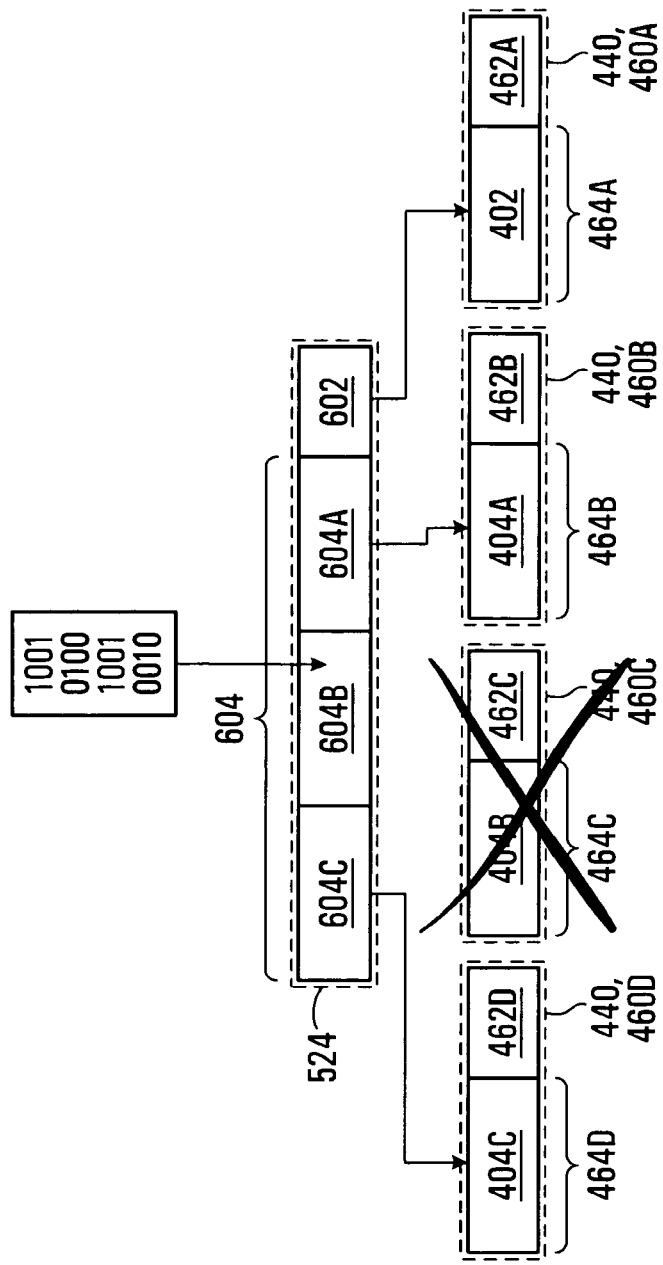
FIG. 6 conceptually illustrates a manner of reassembling downstream packets, in accordance with an embodiment of the present invention.

Reference is now made to FIG. 6, which shows one example of how packet reconstruction can be performed by the downstream reassembly unit 502. This example assumes the scenario of FIG. 4B and further assumes that encapsulated packet 460C was not transmitted along the high-capacity communication link 112. In this case, the downstream reassembly unit 502 will read the headers 462A, 462B, 462D of the encapsulated packets 460A, 460B, 460D. As per the above example, the headers 462A, 462B and 462D contain sequence information that is interpreted as "header for packet X", "segment 1 of 3 of body of packet X" and "segment 3 of 3 of body of packet X", respectively.

Thus, the downstream reassembly unit 502 creates certain segments of a reconstructed downstream packet 524, which will be based on the content of the bodies 464A, 464B and 464D associated with the encapsulated packets 460A, 460B, 460D that were received from the demultiplexer 254.

However, the downstream reassembly unit 502 also realizes that no received encapsulated packet contains a header containing sequence information that would be interpreted as "segment 2 of 3 of body of packet X". The downstream reassembly unit 502 may wait for some more time to elapse in case the missing encapsulated packet is received out of order. However, if nothing is received, then the missing encapsulated packet is replaced in the reconstructed downstream packet 524 as will now be described.

In particular, the reconstructed downstream packet 524 will have a header 602 and a body 604. In the above example scenario, the header 602 will be filled with the body 464A of encapsulated packet 460A, whose header 462A was interpreted as "header for packet X". Also, based on received information, the downstream reassembly unit 502 knows that there are three parts to the body 604 and knows which parts of the body it can fill with data. In this case, a first segment of the body, denoted 604A, is filled with the body 464B of encapsulated packet 460B, whose header 462B was interpreted as "segment 1 of 3 of body of packet X". In addition, a second segment of the body, denoted 604C, is filled with the body 464D of encapsulated packet 460D, whose header 462D was interpreted as "segment 3 of 3 of body of packet X". As for the missing segment of the body between segments 604A and 604C (and denoted 604B), this can be filled with dummy data, such as zeroes, ones, a random combination of zeroes and ones, a code indicative of an error, etc.

Returning now to FIG. 5, it will be appreciated that each reconstructed downstream packet 524 output by the downstream reassembly unit 502 forms a structurally complete packet having at least a portion (including at least the header) that is identical to a corresponding portion in a corresponding original downstream packet 124. The reconstructed downstream packets 524 are supplied to the modem 258, which modulates the reconstructed downstream packets 524 into a form suitable for transmission onto the respective local loop 110. This may involve modulation using a format such as DMT, CAP, QAM, QPSK, etc. but of course other formats may be used without departing from the spirit of the invention.

The modem 258 outputs a modulated signal to the digital-to-analog converter, which outputs an analog signal to the hybrid 260. The hybrid 260 is connected to the local loop 110 and is a standard component in the industry, which allows a signal to be added in one direction of travel along a wire while extracting a signal from the other direction of travel along the same wire. As a result, a downstream analog signal is sent to the CPE 108 over the local loop 110.

The activities of the CPE 108 upon receipt of the downstream analog signal are well understood in the art and therefore need not be expanded upon here. It is noted that because the reconstructed downstream packets 524 transmitted from the remote subsystem 104* to the CPE 108 are structurally complete packets from the point of view of the CPE 108, it will not detect an erroneous transmission. Moreover, where UDP or a similar connectionless protocol is used, the CPE 108 will not question the correctness of the data in the body of each reconstructed downstream packet 524. As a result, a retransmission will not be requested, which keeps bandwidth usage under control.

The impact, if any, on the end user application or device will be limited to that caused by the lack of a portion of data in a reconstructed downstream packet 524 corresponding to an original downstream packet 124. Clearly, the negative impact on the perceived quality of, for example, a video stream, will be less severe than what would have been caused by the omission or deletion of the entire original downstream packet 124.

Variant Using Flow Control (Upstream)

The upstream direction of communication is now considered. Specifically, while sending the downstream analog signal to the CPE 108 over a given local loop 110, the hybrid 260 in the associated loop processing unit 570 meanwhile receives an upstream analog signal from the given local loop 110. This upstream analog signal, which contains digitally modulated upstream packets 534 from the CPE 108 associated with the given local loop 110, is fed to the analog-to-digital (A/D) converter in the associated loop processing unit 570, which outputs a digital signal for demodulation by the modem 258 into the upstream packets 534. The upstream packets 534 are then transmitted to the upstream segmentation unit 504 in the associated loop processing unit 570.

The upstream segmentation unit 504 is connected to the selective transmission unit 508 in the associated loop processing unit 570. The upstream segmentation unit 504 may be implemented in hardware, firmware, software or a combination thereof. In operation, the upstream segmentation unit 504 segments each of the upstream packets 534 received from the corresponding modem 528 into one or more corresponding encapsulated packets 540. Ways in which the upstream segmentation unit 504 can break up an upstream packet 534 into one or more encapsulated packets 540 are similar to those described above with reference to FIGS. 4A and 4B in the context of segmentation of a downstream packet 124. The output of the upstream segmentation unit 504 is thus a stream of encapsulated packets 540, which is provided to the selective transmission unit 508 in the associated loop processing unit 570.

The purpose of the selective transmission unit 508 is to reduce bandwidth over the high-capacity communication link 112 on the basis of a bandwidth control signal provided by the control unit 506 via a respective control link 520. (In an alternative embodiment, separate control units 506 may be provided for each loop processing unit 570.) The selective transmission unit 508 is connected to a respective input port of the multiplexer 264 via a link 562 over which selected ones of the encapsulated packets 540 received from the upstream segmentation unit 504 are transmitted. The selective transmission unit 508 may be implemented in hardware, firmware, software or a combination thereof.

In a non-limiting example embodiment, the bandwidth control signal is generated on the basis of a flow control algorithm executed by the control unit 506 using hardware, firmware, software or a combination thereof. In another example embodiment, the bandwidth control signal is generated on the basis of a flow control algorithm executed by the routing unit 302 in the head end subsystem 102*. In such a case, the routing unit 302 estimates the status of the downstream and upstream traffic and provides control information to the control unit 506 so that localized network traffic optimization can be performed for the remote subsystem 104* serving customers in a certain geographical region. The head end subsystem 102* may forward the bandwidth control signal to the control unit 506 in a specially marked time slot recognized by the demultiplexer 254, or as a specially marked packet, etc.

It should be understood that there is no particular limitation on the flow control algorithm that may be executed by the routing unit 302 or the control unit 506, and that any existing or newly developed flow control algorithms can be used.

The bandwidth control signal that results from execution of the flow control algorithm, and which is output on the control link 520 leading to the selective transmission unit 508 in a given one of the loop processing units 570, is an indication of how much bandwidth throttling is required, namely how much of the data that originated from the associated CPE 108 should be withheld (i.e., not transmitted on the high-capacity communication link 112). This information, which represents a data rate reduction for the given local loop, may be communicated to the selective transmission unit 508 in the form of an absolute (e.g., Mbps) or relative (e.g., percentage) amount.

Thus, for example, where the bandwidth control signal specifies that the upstream data rate from a given CPE 108 should be reduced by 20%, this causes the corresponding selective transmission unit 508 to withhold selected ones of the encapsulated packets 540 so as to result in a data rate reduction of 20%. In order to allow the head end subsystem 102* to perform eventual reconstruction of the upstream packets 534, it would be advantageous to refrain from withholding encapsulated packets 540 that contain the headers of the upstream packets 534.

It should be appreciated that the required data rate reduction can be applied to encapsulated packets 540 derived from more than a single upstream packet 534. For example, if a data rate reduction of 20% needs to be applied, then every fifth encapsulated packet 540 not containing the header of a corresponding upstream packet 534 can be withheld, which could result in some upstream packets 534 having one of their encapsulated packets 540 withheld, other upstream packets 534 having multiple ones of their encapsulated packets 540 affected and still other upstream packets 534 passing through the selective transmission unit 508 unscathed. It should be appreciated that the withheld encapsulated packets can be discarded, deleted, archived, etc.

Thus, it will be seen that the composition of the selected encapsulated packets 540 that remain after bandwidth reduction has been performed by the selective transmission unit 508 associated with a given loop processing unit 570 includes one or more encapsulated packets 540 corresponding to each upstream packet 534 received from the corresponding CPE 108. One of these selected encapsulated packets 540 will include at least the header of the corresponding upstream packet 534. It is recalled that the encapsulated packets 540 include their own headers, and thus where a particular encapsulated packet has been selectively withheld from transmission by the selective transmission unit 508, there will be a gap in the sequence count of the remaining encapsulated packets. The selective transmission unit 508 sends the selected encapsulated packets 540 to the multiplexer 264 over the data link 562.

The multiplexer 264 combines the various encapsulated packets 540 together into a high-speed signal which is provided to the electro-optic conversion unit 268. In a non-limiting example embodiment, the multiplexer 264 may be a TDM multiplexer. The electro-optic conversion unit 268 performs conversion of this high-speed signal into optical form, which is then released onto the optical fiber 112 for transmission to the head end subsystem 102*. The optical fiber 112 thus carries an optical signal that contains selected ones of the encapsulated packets 540 derived from the upstream packets 534 originating from the various CPEs 108.

At the head end subsystem 102*, and with reference again to FIG. 3, the opto-electronic conversion unit 210 converts the optical signal into a high-speed electrical signal, which is fed to the demultiplexer 326. The demultiplexer 326 (e.g., a TDM demultiplexer) reverses the effect of the multiplexer 264 in the remote subsystem 104* by separating the packet streams in the high-speed electrical signal received from the opto-electronic conversion unit 210 on a per-local-loop basis. Thus, the encapsulated packets 540 originating from a particular one of the CPEs 108 is sent to a respective input of the upstream reassembly unit 310 via a respective data link 324. In a specific embodiment, the upstream reassembly unit 310 may comprise a plurality of reassembly units, one associated with each of the local loops 110.

The upstream reassembly unit 310 thus receives a plurality of streams of encapsulated packets 540 from the demultiplexer 326. It is recalled that the encapsulated packets 540 in a given stream of encapsulated packets were created by a given upstream segmentation unit 504 (in the remote subsystem 104*) and were selected by the corresponding selective transmission unit 508 (also in the remote subsystem 104*) from a possibly larger subset of encapsulated packets 540 so as to achieve data rate reduction targets for the high-capacity communication link 112. For each of the received streams of encapsulated packets 540, the upstream reassembly unit 502 creates a stream of reconstructed upstream packets 334 on the basis of the received encapsulated packets 540. The upstream reassembly unit 310 may be implemented in hardware, firmware, software or a combination thereof.

It is noted that due to application of the flow control algorithm in the remote subsystem 104*, not all encapsulated packets 540 derived from a common upstream packet 534 will have been transmitted by the remote subsystem 104*. In such cases, it becomes impossible for the upstream reassembly unit 310 to reconstruct with 100% correctness the original upstream packet 534. However, it is desirable to retain the semblance of a complete packet when routing such packet over the data network 120. Therefore, the upstream reassembly unit 310 functions to identify gaps in the received encapsulated packets 540 and to compensate for those gaps by inserting dummy information at specific locations of certain reconstructed upstream packets 334. Identification of the gaps can be facilitated if a sequence counter or other mechanism was used in the remote subsystem 104* to identify sequence information for each encapsulated packet 540 derived from a common upstream packet 534.

It will thus be appreciated that each reconstructed upstream packet 334 output by the upstream reassembly unit 310 forms a structurally complete packet having at least a portion (including at least the header) that is identical to a corresponding portion in a corresponding original upstream packet 534. The reconstructed upstream packets 334 are supplied to the routing unit 302, which routes the reconstructed upstream packets in a suitable manner (i.e., towards the data network 120 over data link 122). Stated differently, the reconstructed upstream packets 334 will be delivered "as is" over the data network 120.

It is noted that because the reconstructed upstream packets 334 being received at the routing unit 302 are structurally complete packets, the routing unit 302 will not detect an error on the basis of the packet's structure. Moreover, where UDP or a similar connectionless protocol is used, the routing unit 302 will not look into the packet's content and therefore will not question the validity of the data in the body of each reconstructed upstream packet 334. As a result, a retransmission will not be requested, which keeps bandwidth usage under control.

The effect on the recipient of a reconstructed upstream packet 334 corresponding to an original upstream packet 534, if any, will be caused by the possible lack of a portion of data in the reconstructed upstream packet 334, which effect is less significant than what would have been caused by the omission or deletion of the original upstream packet 534 in its entirety. Moreover, because routing functionality is the responsibility of the head end subsystem 102*, the remote subsystem 104* of the present invention has a lower processing requirement than a conventional DSLAM implemented entirely in the outside plant. This lower processing requirement advantageously results in less heat dissipation, which means that the remote subsystem 104* is less likely to require servicing.

Those skilled in the art will appreciate that there variants of the embodiments disclosed above are possible. For example, certain parts of the above disclosure have pointed out that if an encapsulated packet is to be withheld, then it would be advantageous if that encapsulated packet were not the encapsulated packet carrying the header of the corresponding original (downstream or upstream) packet. It is thus within the scope of the present invention to implement a higher layer protocol which ensures the integral delivery of the header of each original packet, without necessarily even requiring that the header be encapsulated.

While specific embodiments of the present invention have been described and illustrated, it will be apparent to those skilled in the art that numerous modifications and variations can be made without departing from the scope of the invention as defined in the appended claims.

What is claimed is:

1. A distributed digital subscriber line access multiplexer (DSLAM), comprising:
    a head end subsystem located within a switching facility;
    a remote subsystem located outside of the switching facility;
    said head end subsystem being operative for routing streams of data from a data network to said remote subsystem over a communication link, said streams of data having packets each comprising header information associated with identification of respective local loops, the communication link carrying at least one multiplexed data signal into which a plurality of said streams of data associated with at least two local loops have been multiplexed by allocating a recurring slice of time to each of the local loops;
    said remote subsystem being operative for transmitting analog signals over a set of local loops;
    wherein said remote subsystem comprises:
        a demultiplexer having (i) a plurality of outputs and (ii) an input for connection to the communication link, said demultiplexer being operative for demultiplexing, on a per-local-loop basis, the multiplexed data signal arriving at its input into respective signals released at its outputs by allocating data to a local loop on a basis of a time slice occupied by a given data; and
        a plurality of loop processing units each having a respective input coupled to a respective one of said outputs of said demultiplexer and a respective interface for connection to a respective one of the local loops, each of said loop processing units being operative for modulating the signal arriving from the respective output of said demultiplexer into a respective modulated signal and for converting the respective modulated signal into an analog signal released via the respective interface.

2. The distributed DSLAM defined in claim 1, wherein said head end subsystem comprises:
    a routing unit having a plurality of outputs and an input for connection to the data network, said routing unit being operative for routing a packet of data arriving at its input to a particular one of its outputs as specified in the packet of data; and
    a multiplexer having a plurality of inputs and an output for connection to the communication link, each of said inputs being coupled to a respective one of said outputs of said routing unit, said multiplexer being operative for multiplexing packets of data arriving at its inputs into a signal released at its output.

3. The distributed DSLAM defined in claim 2, wherein said head end subsystem further comprises:
    an electro-optic conversion unit having an input coupled to said output of said multiplexer and an output for connection to the communication link, said electro-optic conversion unit being operative for converting the signal arriving at its input from said multiplexer into an optical signal released at its output.

4. The distributed DSLAM defined in claim 3, wherein the multiplexer is a time-division multiplexer.

5. The distributed DSLAM defined in claim 1, wherein said remote subsystem further comprises:
    an opto-electric conversion unit having an input for connection to the communication link and an output coupled to said input of said demultiplexer, said opto-electric conversion unit being operative for converting an optical signal arriving at its input into a signal released at its output.

6. The distributed DSLAM defined in claim 5, wherein the demultiplexer is a time-division demultiplexer.

7. The distributed DSLAM defined in claim 6, wherein each of said loop processing units comprises:
    a modem for modulating the signal arriving from the respective output of said multiplexer into the respective modulated signal; and
    a digital-to-analog converter for converting the respective modulated signal into the analog signal released via the respective interface.

8. The distributed DSLAM defined in claim 1, wherein each of said loop processing units has an output, said remote subsystem further comprising:

a multiplexer having a plurality of inputs and an output, each of said inputs being coupled to said output of a respective one of said loop processing units, said multiplexer being operative for multiplexing, on a per-local-loop basis, data arriving at its inputs into a multiplexed data signal released at its output.

9. The distributed DSLAM defined in claim 1, wherein said remote subsystem is located at a distance of at least 1 km from the switching facility.

10. The distributed DSLAM defined in claim 1, wherein the communication link is a first communication link and wherein the switching facility comprises a digital loop carrier local exchange terminal, said remote subsystem comprising a remote subscriber terminal operative for communicating with the digital loop carrier local exchange terminal via a second communication link.

11. The distributed DSLAM defined in claim 10, wherein the second communication link carries baseband telephony signals.

12. The distributed DSLAM defined in claim 11, wherein the first communication link and the second communication link are a shared communication link.

13. A method comprising:
routing streams of data from a data network through a head end subsystem located within a switching facility to a remote subsystem located outside of the switching facility, said streams of data having packets each comprising header information associated with identification of respective local loops, a communication link between the head end subsystem and the remote subsystem carrying at least one multiplexed data signal into which a plurality of said streams of data associated with at least two local loops have been multiplexed by allocating a recurring slice of time to each of the local loops;

at the remote subsystem, demultiplexing, on a per-local-loop basis, the multiplexed data signal arriving from the head end subsystem into respective signals released at a plurality of demultiplexer outputs by allocating data to a local loop on a basis of a time slice occupied by a given data;

at the remote subsystem, a plurality of loop processing each of a respective one of said outputs of said demultiplexer for modulating the signal arriving from the respective demultiplexer output into a respective modulated signal;

at the remote subsystem, converting each respective modulated signal into a respective one of a plurality of analog signals; and from the remote subsystem, transmitting the analog signals over a set of local loops.

14. The method defined in claim 13, further comprising:
at the head end subsystem, routing a packet of data arriving at an input of a routing unit to a particular output of the routing unit as specified in the packet of data.

15. The method defined in claim 14, further comprising:
at the head end subsystem, multiplexing packets of data arriving from outputs of the routing unit into the multiplexed data signal released towards the remote subsystem.

16. The method defined in claim 15, further comprising:
converting the signal into an optical signal before it is released towards the remote subsystem.

17. The method defined in claim 15, wherein the multiplexing comprises time-division multiplexing.

18. The method defined in claim 16, further comprising:
at the remote subsystem, converting the optical signal arriving from the head end subsystem into an electrical signal.

* * * * *